Patented Sept. 14, 1954

2,689,242

UNITED STATES PATENT OFFICE 2,689,242 pH CONTROL IN THE EMULSION POLYMERIZATION OF VINYL CHLORIDE

Fred J. Lucht, Springfield, Mass., assignor to Monsanto Chemical Company, St. Louis, Mo., a corporation of Delaware No Drawing. Application March 20, 1951, Serial No. 216,669

4 Claims. (Cl. 260—92.8)

This invention relates to the polymerization of vinyl chloride in aqueous emulsion. More particularly, the invention relates to a process for the aqueous emulsion polymerization of vinyl chloride to obtain polymers having exceptional heat stability.

The polymers and copolymers of vinyl chloride are noted for their lack of stability when subjected to elevated temperatures. Many means have been proposed for counteracting the instability, most of which have comprised the addition to the polymer or copolymer of various basic materials and organo metallic compounds. These materials are all at least partially effective but have the disadvantage that they generally diminish the clarity of the polymer or copolymer.

An object of this invention is to provide a process for the polymerization of vinyl chloride in aqueous emulsion.

A further object is to provide an aqueous emulsion polymerization method for producing vinyl chloride polymers having exceptionally high heat stability.

Another object is to produce vinyl chloride polymer emulsions which may be freed from water by simple drying processes to produce powders which may be molded, calendered or extruded to provide a clear heat-stable article.

These and other objects are obtained by polymerizing vinyl chloride in aqueous emulsion in contact with an emulsifying agent, a reducing agent, a peroxy catalyst and a buffer under strictly controlled conditions while maintaining a specific balance between the various ingredients.

The following examples are given in illustration and are not intended as limitations on the scope of this invention. Where parts are mentioned, they are parts by weight.

Example I

An emulsion polymerization medium was prepared by dissolving 0.2 part of sodium lauryl sulfate, 0.04 part of sodium bisulfite, and 0.05 part of sodium bicarbonate in 150 parts of water. The solution was placed in a jacketed autoclave and heated to about 48° C. The reaction vessel was then purged of oxygen by evacuating the chamber and releasing the vacuum with oxygen-free nitrogen. A vacuum was then reapplied to the vessel and 20 parts of vinyl chloride were passed into the emulsifying solution and agitation was started. An aqueous solution consisting of 0.006 part of potassium persulfate dissolved in 6 parts of water was added drop-wise to the reaction vessel at such a rate that the temperature of the polymerization reaction was maintained at 48° C.±1° C. At the same time, 80 parts of vinyl chloride were fed into the reaction vessel at such a rate as to maintain a pressure of 90–97 p. s. i. g. therein. The addition of the vinyl chloride took place over a period of about three hours. During this time, a large part of the catalyst solution had been added but not all of it. Addition of the remainder of the catalyst solution was continued until a pressure drop occurred in the reaction vessel indicating the approximate end of the reaction. The polymerization was continued after the beginning of the pressure drop without the addition of further catalyst until the pressure reached 50 p. s. i. g. At this point, the polymerization reaction was substantially complete. The remaining pressure in the vessel was released resulting in a purge of the residual vinyl chloride monomer. Constant agitation was maintained throughout the reaction.

The product of Example I was a stable emulsion of polymerized vinyl chloride which could be stored at 15–50° C. for extended periods of time without resolution thereof. The particle size of the polymer, as determined by electron micrographs, averaged 0.05 mu. and all particles were within the range of 0.03–0.08 mu. The water was removed from the emulsion by a drum drying process to provide a pulverulent vinyl chloride resin. The yield of resin was about 92% of theoretical. When the polyvinyl chloride thus obtained was molded, the articles obtained were found to be substantially colorless and free from haze. The heat stability of the polymer was measured by mixing 100 parts of polymer with 50 parts of dioctyl phthalate, milling the mixture on heated rolls at 150° C. for five minutes, molding the milled mixture into .030″ slabs at 160° C. and then heating the slabs in air at 160° C. for two hours. When the polymer obtained in Example I was tested in this manner, it showed little change after two hours at 160° C.

When an attempt was made to prepare similar polymers using the same ingredients and the same process except that all of the catalyst was added at the start of the polymerization reaction, the reaction was extremely rapid, temperature control was practically impossible and after 30 minutes no further polymer was formed but the yield was only 40% of theoretical. The polymer produced had a relatively high initial color and turned dark brown within one hour in the heat stability test at 160° C.

Example II

An emulsion polymerization medium was prepared by dissolving 0.05 part of sodium stearyl sulfate, 0.01 part of sodium formaldehyde sulfoxylate and 0.02 part of sodium bicarbonate in 200 parts of oxygen-free water. The solution was placed in an autoclave fitted with a reflux condenser. The temperature of the solution was raised to 50° C., agitation commenced and the reaction vessel was purged of oxygen by evacuating the chamber and releasing the vacuum with oxygen-free nitrogen. The chamber was then re-evacuated and 20 parts of substantially pure vinyl chloride were passed into the emulsion medium while maintaining constant agitation and a temperature of 50° C. At this temperature, the vapor pressure of vinyl chloride produced a pressure of 100 p. s. i. g. in the reaction vessel. An aqueous solution of 0.001 part of ammonium persulfate dissolved in one part of water was added dropwise at such a rate that the temperature of the polymerization reaction was maintained at 49–51° C. At the same time, 80 parts of substantially pure vinyl chloride were pumped into the reaction vessel at such a rate as to maintain a pressure of 100 p. s. i. g. therein. The vinyl chloride addition was completed in about 15 hours. During this period, a major portion of the catalyst solution had been added. The polymerization reaction was continued after the last addition of vinyl chloride with continued addition of catalyst until a pressure drop occurred indicating substantial completion of the polymerization. At this point, the addition of catalyst was stopped abruptly, but the reaction was allowed to proceed for about 60 minutes at which time the pressure had dropped to about 60 p. s. i. g. The pressure was then released to purge the reaction vessel of unreacted vinyl chloride monomer.

The product obtained was an emulsion of polyvinyl chloride in which the particle size ranged from 0.05 to 0.08 mu. The emulsion was stable in storage at 15–50° C. over extended periods of time but showed slightly more settling tendencies than the emulsion obtained in Example I. The emulsion was dried in a 100° C. oven to yield a particulate vinyl chloride resin. This resin, when fabricated by conventional molding, extrusion and calendering methods, produced articles of exceptionally good clarity and stability. In the heat stability test, substantially no change in color was observed in two hours at 160° C.

Example III

An emulsion polymerization medium was prepared by dissolving 0.3 part of sodium palmityl sulfate, 0.1 part of sodium formaldehyde sulfoxylate and 0.1 part of sodium bicarbonate in 100 parts of water. The solution was placed in a jacketed autoclave and heated to about 60° C. The reaction vessel was purged of oxygen and 20 parts of substantially pure vinyl chloride was added with agitation. The vinyl chloride produced a pressure of about 130 p. s. i. g. in the reaction vessel. A solution of 0.008 part of potassium persulfate dissolved in 5 parts of water, was added slowly to the reaction medium at such a rate that the temperature was maintained at 59–61° C. At the same time, 80 parts of substantially pure vinyl chloride was forced into the reaction vessel by oxygen-free nitrogen at such a rate as to maintain a pressure of about 130 p. s. i. g. therein. The addition of the vinyl chloride was completed in about two hours at which time a minor portion of the catalyst solution remained unadded. This catalyst solution was added slowly as long as the pressure remained at 130 p. s. i. g. At the first sign of pressure drop, addition of catalyst was terminated but the reaction was continued until the pressure dropped to about 50 p. s. i. g. The pressure was then released quickly to purge the vessel of unreacted vinyl chloride.

The resultant emulsion contained vinyl chloride having a particle size ranging from 0.03 to 0.08 mu. The emulsion was stable in storage at 15–50° C. for several months. On drum drying, a pulverulent resin was obtained which could be molded, extruded or calendered to produce a clear article containing substantially no haze. The resin showed substantially no discoloration in the heat stability test in two hours at 160° C.

In carrying out the process of this invention, the amounts of emulsifying agent, catalyst, buffer and reducing agent are critical.

The emulsifying agent must be an ammonium or alkali metal sulfate of a long chain saturated aliphatic compound containing from 10 to 20 carbon atoms. Thus, the ammonium, sodium, potassium, rubidium and cesium salts of decyl, dodecyl, palmityl, stearyl, dodecanoyl, etc. sulfates may be used. The quantity of the emulsifying agent is strictly limited to from 0.05 to 0.3 part per 100 parts of monomer. If more than 0.3 part is used, the emulsion obtained must be coagulated and the coagulate washed with water in order to obtain haze-free stable moldings. If less than 0.05 part is used, very little emulsifying action is obtained.

The catalyst may be any of the water-soluble peroxy catalysts including water-soluble peroxides and persalts. Among these, ammonium, sodium and potassium persulfate are preferred. The amount of catalyst used is restricted on a basis of from 0.00006 to 0.0006 part of available oxygen per 100 parts of monomer. In addition to this restriction, the catalyst must be added to the polymerization medium in small increments or continuously during the course of the polymerization up to the point of pressure drop. No catalyst may be added after the pressure begins to fall off. The addition of the catalyst must be also controlled so that no more than 0.000005 to 0.00005 part of oxygen is present in the reaction medium at any one time. In order to obtain accurate control of the addition of the catalyst, it is preferred to dissolve the catalyst in from 100 to 1000 times its weight of water and then to add the solution to the reaction medium at such a rate that the temperature of the emulsion does not vary more than 2° C. This temperature control may be facilitated by circulating cold water through a jacketed reaction vessel but it is directly dependent on the rate of addition of catalyst and the mol ratio of catalyst to reducing agent. With proper control of the catalyst addition, amounts of reducing agent and with sufficient external cooling means, it is practical and desirable to maintain the polymerization temperature within the 2° C. range.

The buffer is preferably sodium bicarbonate since its decomposition products are not deleterious to the resultant polymer. Other buffers which are relatively inert in the polymer may be used such as sodium carbonate, ammonium hydroxide, etc.

The amount of buffer used is that amount which is sufficient to maintain a pH of the emulsion at from 4 to 8. For homopolymerization of vinyl chloride or copolymerization thereof with monomers such as vinylidene chloride and vinyl acetate, the pH should be kept at from 7.0 to 7.7 since, at a pH of 6 these polymers and copolymers have more basic color and show a greater tendency to discolor on heating than do polymers produced within the narrow range. Below a pH of 6, vinyl chloride will not polymerize in this system to any substantial extent to form a homopolymer. For the preparation of copolymers of vinyl chloride with such materials as diethyl maleate, the operable pH range is from 4 to 6. The amount of buffer necessary to obtain the desired pH ranges from 0.01 to 0.1 part per 100 parts of monomer.

The reducing agent is sodium bisulfite, sodium formaldehyde sulfoxylate, or other oxidizable sulfoxy compound including sulfur dioxide, sodium hydrosulfite, sodium thiosulfite, and organic oxidizable sulfoxy compounds such as diethyl sulfite, paratoluene sulfinic acid, etc. The amount of sulfoxy compound must be regulated with respect to the amount of catalyst used. A large excess of reducing agent over that necessary to react with all of the oxygen released by the catalyst must be used. On a molar basis, at least from six to seven mols of reducing agent must be used for each mol of catalyst. Optimum control of reaction temperature and maximum stability of the resulting polymer are only attained if from 10 to 20 mols of reducing agent are used. Furthermore, it is essential that the reducing agent be added either entirely at the beginning of the reaction or at such a rate that there is always present in the reaction medium at least six mols and preferably ten mols of reducing agent per mole of catalyst.

The amount of water needed to prepare the emulsions of this invention is not critical as long as there is enough present to constitute an aqueous phase. In general, from 100 to 200 parts of water may be used for every 100 parts of monomer.

One of the most critical phases of the process of this invention is the control of the reaction temperature. Depending on the amounts and types of the various ingredients, the reaction may be carried out between 30° C. and 65° C. but the temperature variation in any single reaction must not vary more than 2° C. This extremely close control of the temperature is attained by a plurality of means. In the first place, external cooling means such as a jacketed reaction vessel or a reflux condenser are employed to remove excessive heat of reaction. Secondly, the catalyst is added slowly from a dilute solution thereof in water over the entire period of the reaction. By controlling the rate of addition of the catalyst, further control of the reaction temperature is maintained, i. e., slight increases or decreases in addition rate result in immediate corresponding increases or decreases in the reaction temperature. However, even close control of the catalyst addition rate is of no avail unless there is constantly present at least from 6 to 7 mols of reducing agent per mol of catalyst in the reaction medium. In other words, the necessary temperature control is dependent on external cooling, the presence of critical amounts of reducing agent and the regulation of the rate of addition of the catalyst.

In preparing a homopolymer, all of the vinyl chloride may be added at the start of the reaction but for reasons of economy and safe operation, it is preferred to add the vinyl chloride monomer to the reaction vessel in increments or continuously during the polymerization reaction. About 20% of the monomer may be added initially and the remainder introduced continuously or portion-wise to maintain a pressure of from 50 to 150 p. s. i. g. in the reaction vessel. These pressure conditions combined with the temperature restrictions promote the production of a polymer of optimum molecular weight for molding powders or for calendering and extrusion operations. If a copolymer is prepared by this process, the co-monomers may be mixed together in the proportions desired in the final polymer and the mixture may then be added to the reaction vessel at the rate at which the mixture co-polymerizes. Another conventional method may also be used which comprises adding all of the slower polymerizing material to the reaction vessel and then adding the faster polymerizing material at the rate at which it is used up.

The process of this invention is applicable to the preparation of polymers of vinyl chloride and copolymers thereof in which vinyl chloride constitutes at least 50% by weight of the copolymer. Among the materials which may be copolymerized with vinyl chloride in the process of this invention are vinyl esters such as vinyl acetate, vinyl butyrate, vinyl stearate, vinyl benzoate, acrylic and alpha-substituted acrylic esters, nitriles and amides such as methyl acrylate, ethyl methacrylate, butyl phenacrylate, acrylonitrile, methacrylonitrile, atroponitrile, methacrylamide, etc., esters of alpha,beta-ethylenically unsaturated dicarboxylic acids such as the dialkyl esters of maleic, fumaric, citraconic, mesaconic, itaconic, etc. acids including diethyl maleate, diethyl fumarate, dibutyl itaconate, etc., vinylidene halides such as vinylidene chloride, vinylidene chlorofluoride, etc.

The emulsions produced by the process of this invention are stable in storage at ordinary temperatures, i. e. from 15° C. to 50° C., for periods up to about several months. They may be resolved by coagulation with electrolytes, followed by filtration and washing, if desired, but for most purposes it has been found that they may be resolved by simple drying methods such as drum drying, oven drying or spray drying.

By using the particular adjuvants described above, in the ranges specified, it has been found that polymers are obtained which may be molded by injection or compression methods or calendered into articles which are devoid of haze and which are particularly stable to heat. There is no need for removal of the adjuvants by washing procedures in order to obtain a stable and haze-free product.

Thus, the process of this invention provides a simple and extremely rapid method for polymerizing or copolymerizing vinyl chloride in aqueous emulsion to obtain products which are heat-stable and which may be molded or calendered to obtain haze-free articles without first removing excess emulsifying agent, catalyst, reducing agent or buffer.

It is obvious that many variations may be made in the products and processes of this invention without departing from the spirit and scope thereof as defined in the appended claims.

What is claimed is:

1. A process for the polymerization of a monomeric polymerizable material containing at least 50% by weight of vinyl chloride at a pH of from 7.0 to 7.7, at a temperature of from 30° C. to 65° C. and at a pressure of from 50 to 150 p. s. i. g., which comprises adding part of the monomeric material to an aqueous medium containing per 100 parts of total monomer, from 0.05 to 0.3 part of an alkali metal sulfate of a long chain saturated aliphatic compound containing from 10 to 20 carbon atoms and from 0.01 to 0.1 part of an oxidizable sulfoxy compound, adding a dilute aqueous solution containing from 0.001 to 0.01 part of a water-soluble polymerization catalyst taken from the group consisting of ammonium, potassium and sodium persulfates, said addition being made during the course of the polymerization reaction concurrently with the addition of the balance of the monomer and at such a rate that the reaction temperature varies by no more than 2° C., maintaining a pressure of from 50 to 150 p. s. i. g. in the reaction vessel throughout the reaction, stopping the addition of catalyst coincidentally with the pressure drop at the end of the reaction, and continuing the heating of the reaction medium for at least 15 minutes after the last catalyst addition, the ratio of oxidizable sulfoxy compound to catalyst being at least as great as 6:1 on a molar basis throughout the reaction, the total amount of said catalyst being controlled to provide from 0.00006 to 0.0006 part of available oxygen per 100 parts of monomer.

2. A process as in claim 1 wherein the monomeric material consists of only vinyl chloride.

3. A process as in claim 2 wherein the molar ratio of sulfoxy compound to catalyst is maintained at from 10:1 to 20:1.

4. A process as in claim 3 wherein the temperature range is restricted to from 49° C. to 51° C.

References Cited in the file of this patent

UNITED STATES PATENTS

| Number | Name | Date |
|---|---|---|
| 2,498,226 | Sully | Feb. 21, 1950 |